United States Patent [19]

Jourdan et al.

[11] 4,387,360

[45] Jun. 7, 1983

[54] GLIDEPATH SYSTEM FOR USE WITH AIRCRAFT ALTIMETERS

[76] Inventors: Ray M. Jourdan, 11001 E. 59th St., Raytown, Mo. 64133; Kenneth E. Williams, 5005 W. 72nd St., Prairie Village, Kans. 66208

[21] Appl. No.: 164,884

[22] Filed: Jun. 30, 1980

Related U.S. Application Data

[63] Continuation-in-part of Ser. No. 75,549, Sep. 14, 1979, abandoned.

[51] Int. Cl.³ .................... G01C 21/00; G08B 21/00
[52] U.S. Cl. .......................... 340/27 AT; 73/178 T; 340/27 R; 364/433; 364/430
[58] Field of Search .......... 340/27 R, 27 AT, 27 NA, 340/43, 26, 705, 716, 753, 754, 755; 364/430, 364/428, 433, 705, 424, 434, 435; 73/178 R, 178 T; 343/108 R, 108 SM

[56] References Cited

U.S. PATENT DOCUMENTS

| | | | |
|---|---|---|---|
| 2,732,538 | 1/1956 | De Celles | 340/26 |
| 3,230,507 | 1/1966 | Holt | 340/27 NA |
| 3,505,504 | 4/1970 | Walker | 340/27 R |
| 3,588,477 | 6/1971 | Lami et al. | 340/27 NA |
| 3,668,621 | 6/1972 | Boyd | 340/27 R |
| 3,833,933 | 9/1974 | Wilson | 340/753 |
| 3,967,098 | 6/1976 | Harnagel et al. | 340/27 NA |

Primary Examiner—James J. Groody
Attorney, Agent, or Firm—Krass, Young & Schivley

[57] ABSTRACT

A system for providing an indication of a glidepath for aircraft using a conventional altimeter having a graduated dial scale and a rotatable pointer includes a plurality of individual indicating lights spaced around the circumference of the dial which are individually controlled by an onboard microcomputer to provide a time dependent, moving indication of a descent rate on the dial scale corresponding to a safe, theoretical glidepath, which indication may be followed by the altimeter pointer to maintain the aircraft on the glidepath. The microcomputer includes a microprocessor control unit, a random access memory for temporary data storage and a read only memory for permanent storage of programmed instructions for computing the glidepath. A manually operable keyboard device permits entry of glidepath data regarding the aircraft's speed, position, etc. into the random access memory for storage therein prior to arrival of the aircraft at a position marking the start of the glidepath whereat the system may be activated by operation of a single push button to produce the visual moving indication of the descent rate corresponding to the desired glidepath.

7 Claims, 9 Drawing Figures ized by 4,387,360

GLIDEPATH SYSTEM FOR USE WITH AIRCRAFT ALTIMETERS

RELATED APPLICATIONS

This application is a continuation-in-part of U.S. application Ser. No. 75,549 filed Sept. 14, 1979 now abandoned.

TECHNICAL FIELD

This invention generally pertains to onboard instrumentation for aiding aircraft to make safe landings, and deals more particularly with a system adapted for use with a conventional altimeter instrument which automatically provides a visual indication of a descent rate corresponding to a safe, theoretical glidepath used in the approach to a landing area.

BACKGROUND ART

The adaption of a conventional altimeter instrument for use in indicating a theoretical glidepath in connection with the landing of aircraft is an art recognized concept. For example, U.S. Pat. No. 2,732,538 to De Celles discloses mechanism cooperable with the altimeter and distance measuring equipment of an aircraft to produce glidepath altitude-reference indications comparable by the pilot of the aircraft with his observation of altitude indications of the altimeter. This prior art device for providing an indication of a glidepath was particularly complex in the mechanism which it employed and was therefore quite expensive to manufacture. Of course, many aircraft are not provided with distance measuring equipment in which case the prior art glidepath indicator could not be employed. In any event, prior art glidepath indicator devices of this type were undesirable from the standpoint that readings provided by the distance measurng equipment of an aircraft are relatively accurate when the aircraft is distant from the landing area but are subject to error when the aircraft is in proximity to the landing area, as during a landing approach thereto. Moreover, even though some aircraft are provided with distance measuring equipment, many airports are not provided with the necessary ground instrumentation to permit use of distance measuring equipment for purposes of indicating a glidepath during a landing approach to such airports. In fact, a substantial number of smaller airports include minimal ground instrumentation which only include means for providing a final approach fix which allows the pilot to align the course of the aircraft with the direction of a runway in the landing area.

In connection with these latter mentioned airports, it can be appreciated that prior art glidepath indicating devices of the type used in conjunction with distance measuring equipment are completely incapable of providing an indication of a glidepath to a landing area in such airports, during an approach to the latter under instrument flight rules. This creates a potentially hazardous situation since pilots flying into airports provided with minimal ground instrumentation are sometimes forced to employ rather unsafe techniques for approaching the landing area including either waiting until the aircraft is in close proximity to the landing area and then diving steeply to the minimum descent altitude (MDA) associated with the landing area, thereby risking overshooting the landing area, or by significantly reducing the aircraft's altitude to the MDA well in advance of the landing area, thereby risking collision with tall obstacles laying in the aircraft's path of travel. Thus, there is a clear need in the art for a system which provides an indication of a safe, theoretical glidepath to be followed by an aircraft in making landing approaches to landing areas provided with minimal ground instrumentation.

Another type of prior art glidepath indicator is disclosed in U.S. Pat. No. 3,505,504 wherein an electromechanical system is employed for providing an indication of a theoretical glideslope path using a mechanical pointer driven by an electrical motor. This type of device was not successful in gaining widespread use because of its relative complexity and concomitant expense, in addition to the fact that the device lacked the high reliability demanded by the circumstances under which it was used; error in indicator readings were common because of fluctuation in the speed of the motor used to drive the mechanical indicator.

DISCLOSURE OF INVENTION

A system for providing an indication of a safe, theoretical glidepath employs a microcomputer controlled display device including a plurality of individual indicating lights circumferentially spaced around the perimeter of the conventional altimeter used by the aircraft. A manually operable keyboard operatively intercoupled with the microcomputer allows reference data to be input to the latter, including the aircraft's altitude above an approach fix, the distance between the fix and the minimum descent altitude (MDA) of the airport, the ground speed of the aircraft and the MDA. The microcomputer is programmed to calculate a theoretical glidepath for the aircraft and is further operative, upon selective actuation thereof, to produce a plurality of timing signals corresponding to reference altitudes in the calculated glidepath, which timing signals are delivered to the display means to produce a moving indication of the theoretical glidepath. By adjusting the altitude of the aircraft in a manner to align the pointer of the altimeter of such aircraft with the moving indication of the glidepath, the aircraft is maintained on the safe, calculated glidepath. The system is further adapted to provide a series of theoretical glidepath indications in multiple step landing approaches and includes display means for indicating a countdown of the time remaining until the aircraft reaches the MDA.

BEST MODE FOR CARRYING OUT THE INVENTION

Figure 3:
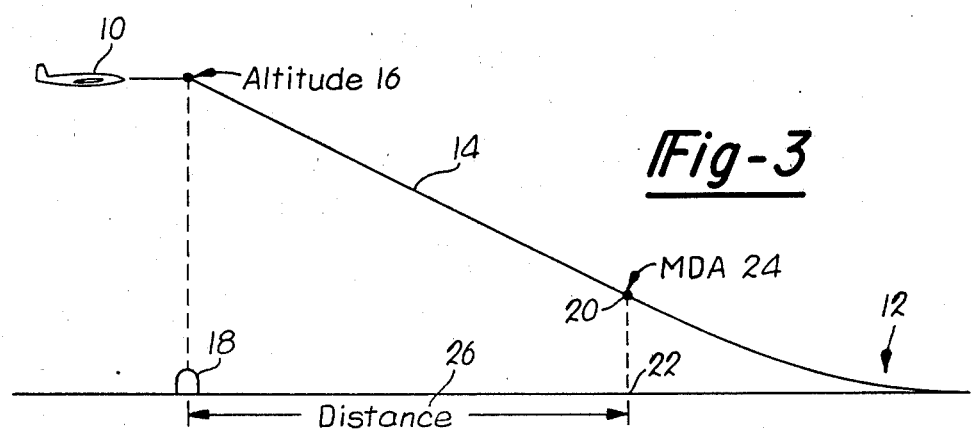
FIG. 3 is a diagrammatic representation of the glidepath to be followed by an aircraft in making an approach to a landing area.

Referring first to FIG. 3, the invention is concerned with allowing the pilot of an aircraft 10 making an approach to a landing area generally indicated by the numeral 12 to maintain such aircraft 10 on an essentially straight, theoretical glidepath 14 extending from a prescribed altitude 16 above an aproach fix 18 and a reference point 20 at an altitude above a ground point 22 corresponding to the minimum descent altitude (MDA) associated with the landing area 12. Since the pilot of the aircraft 10 knows the altitude 16, the MDA 24, the distance 26, as well as the ground speed of the aircraft 10 between the fix 18 and the point 22, it is apparent that the glidepath 14 may be simply calculated using a conventional algorithm.

Figure 1:
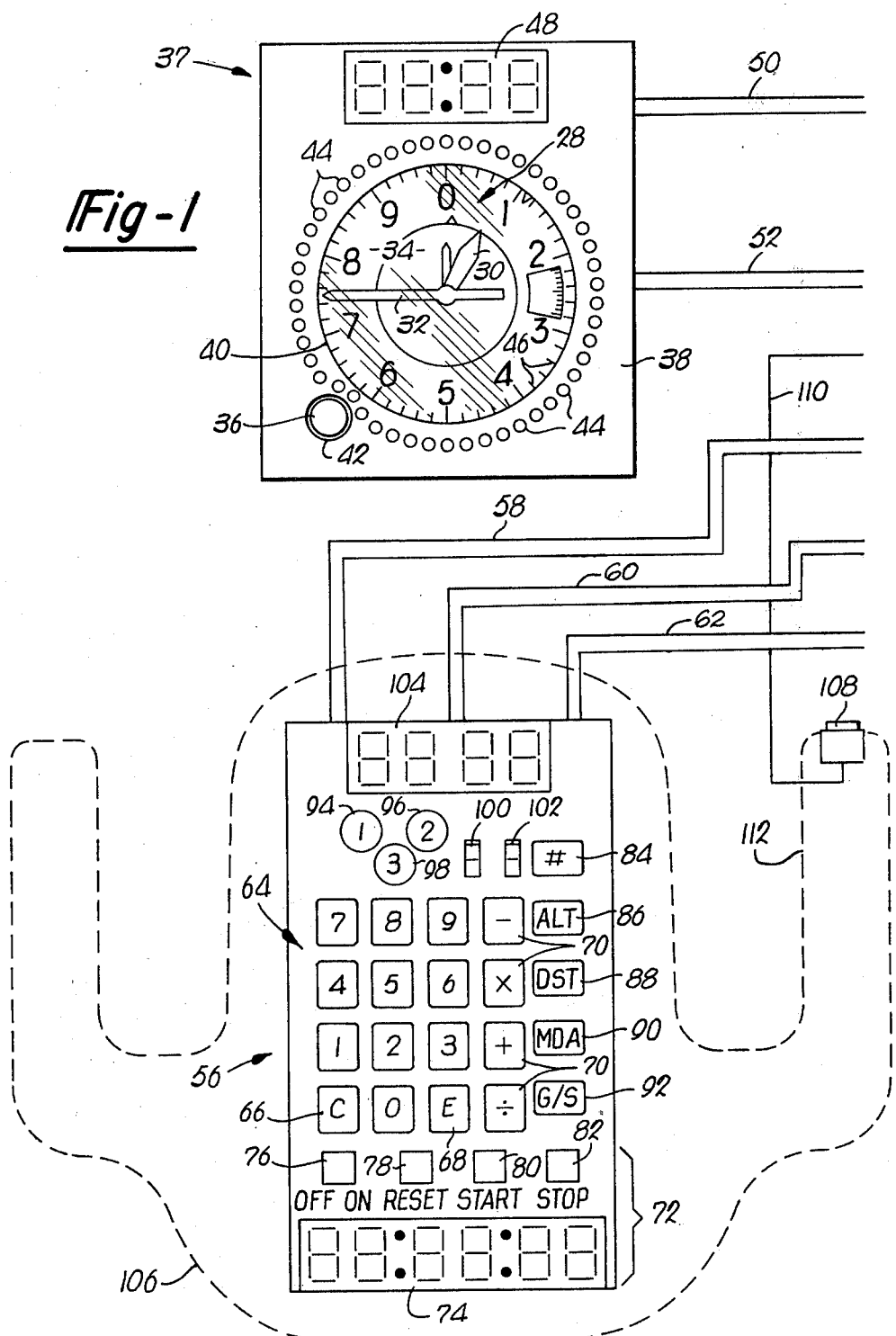
FIG. 1 is a combined elevational and diagrammatic view of a portion of a glidepath system for use with aircraft altimeters, which forms the currently preferred embodiment of the present invention.
Figure 2:
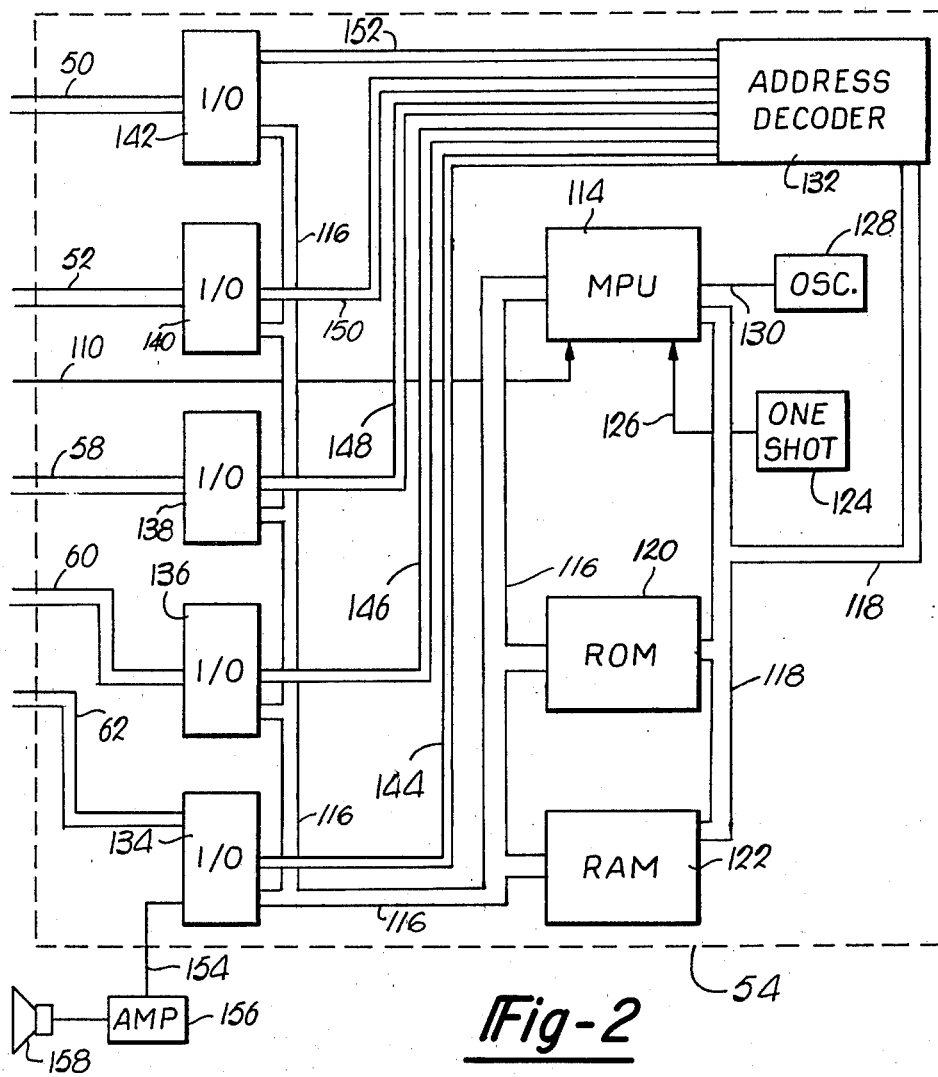
FIG. 2 is a block diagram of another portion of the invention shown in FIG. 1 and interconnects with the latter by placing the same on the righthand side thereof.

Referring now also to FIGS. 1 and 2, the altimeter 28 of the aircraft 10 is of the conventional type for continuously measuring the altitude, by means of pressure or radar techniques, of the aircraft 10 and is provided with altitude indicating pointers 30 and 32 to indicate the altitude of the aircraft 10 upon a calibrated dial face 34, the longer hand 32 making one revolution for each 1,000 feet of altitude change. A forwardly extending, rotatable knob 36 is provided for adjusting, or calibrating, the altimeter 28. Glidepath display means 37 includes a rectangularly shaped plate member 38, made from any suitable rigid material, mounted in proximity to the altimeter 28, and in superimposed relationship to the dial face 34. Plate member 38 is provided with a circular cutout portion 40 therein concentric with the dial face 34, and further includes an aperture 42 permitting the knob 36 pass therethrough. Plate member 38 includes a plurality of electrically energizable indicating elements 44 mounted thereon, by any suitable means, and circumferentially spaced apart around the perimeter of the cutout portion 40, in radially aligned registration with the scale markings 46. Indicating elements 44 may comprise any of various types of electrically powered illuminating devices such as light emitting diodes or conventional incandescent lightbulbs. The plate member 38 also has suitably mounted thereon the four digit, electrically operated display device 48 which may be of a commercially available type employing light emitting diodes, liquid crystals, or the like. The glidepath display means 37 is operably coupled via bus lines 50 and 52 to a later discussed microcomputer generally indicated within the broken line 54.

Information control means generally indicated by the numeral 56 provides for inputting data to the microcomputer 54 and is operably coupled with the latter via bus lines 58, 60 and 62. Control means 56 is provided with a keyboard 64 connected to the output of input-/output device 136 via bus lines 60, which keyboard 64 has a plurality of depressable keys respectively corresponding to the data numbers 0 through 9 and further includes a clear key 66 for clearing data prior to delivery of the latter to the microcomputer 54 as well as an enter key 68 for entering data into the microcomputer 54. Although forming no part of the present invention, keys 70 corresponding to add, subtract, multiply, and divide functions are provided to enable the keyboard 64 to be employed as an ordinary calculator device. Also forming no part of the present invention is a digital chronograph 72 including a six digit electronic time display 74 which employs light emitting diodes or the like, as well as manually operable keys 76–82 respectively corresponding to the functions of off/on, reset, start, and stop.

Control means 56 further includes five, electrically energizable prompt lights 84–92 respectively corresponding to the number of the approach steps which the aircraft 10 will perform during a landing approach, the altitude 16, the distance 26, the MDA 24, and the ground speed of the aircraft 10. Three, selectively energizable lights 94, 96 and 98 respectively correspond to a first, second and third step or glidepath 14 to be executed by the aircraft 10 upon approach to a given landing area 12. A pair of single pole, double throw switches 100 and 102 are respectively operable for energizing the control means 56 and for altering the brightness of the various indicating lights associated therewith between a bright and dim state. A four digit electronic display 104 comprising conventional seven segments light emitting diodes or the like, is provided for visually displaying data input to the microcomputer 54 by means of the keyboard 64. The control means 56 is adapted to be mounted in close proximity to the pilot and is herein shown mounted in the central portion of the aircraft's control wheel indicated by the broken line 106. A manually operable, momentary action push button switch 108 operably coupled by line 110 to the microcomputer 54 is mounted in close proximity to the pilot and is herein shown as being secured to the handgrip section 112 of the control wheel 106.

The microcomputer 54 includes a central microprocessing unit 114 of a conventional type such as that manufactured by the Motorola Semiconductor Products, Inc. and identified by the manufacturer's Part No. MC 6800. The microprocessor unit (MPU) 114 is operably coupled via multi-bit data bus 116 and multi-bit address bus 118 to a read only memory (ROM) 120 as well as to a random access memory (RAM) 122 which are also devices commercially available from the last mentioned manufacturer and are respectively designated by the manufacturer's Part Nos. MCM 6830 and MCM 6810. A one shot, monostable multivibrator 124 has the output thereof operably coupled via line 126 to the reset input of the MPU 114 to allow resetting of the latter.

Figure 4:
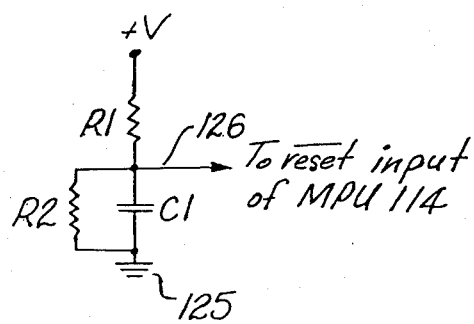
FIG. 4 is a detailed schematic diagram of a circuit for a monostable multivibrator.

The multivibrator 124 may be of conventional circuit design such as that shown in FIG. 4 wherein line 126 (derived from the reset terminal of the MPU 114) is coupled to a source of voltage $+V$ through resistor R1 and to ground 125 through the parallel network of resistor R2 and capacitor C1. The multivibrator 124 functions to deliver a reset pulse to the reset input of MPU 114 via line 126 when power is initially applied to the system. The multivibrator 124 is itself reset only when power is removed from the system.

A crystal controlled oscillator having an operating frequency of 1 MHZ in the preferred form is operably coupled to the clock input of the MPU 114 via line 130 and provides the necessary clock timing for the system. Switch 108 is connected via line 110 to the interrupt request input of the microprocessor unit 114 which controls the generation of an interrupt sequence within the microprocessor unit 114.

The RAM 122 is employed herein as a read/write, or "scratchpad" memory for temporary data storage and has the address inputs thereof operably coupled with the MPU 114 and with the address decoder 132 via address bus 118, while the data input and output of RAM 122 are operably coupled via data bus line 116 to the MPU 114 and a plurality of input/output devices indicated by the numerals 134-142.

As previously indicated, the ROM 120 has its data and address inputs respectively coupled with data bus 116 and address bus 118. The ROM 120 includes permanently stored program instructions for controlling the MPU 114, as well as a subroutine for calculating the glidepath 14. The address decoder 132, herein used for selectively addressing the input/output devices 134-142, is a commercially available item and has the inputs thereof operably coupled to the MPU 114 via address bus 118, while the output thereof is operably coupled by multi-bit address buses 144-152 to the address inputs of the respectively corresponding input/output devices 134-142. The address decoder 132 is under control of the MPU 114 and is operative to selectively address one of the input/output devices 134-142 in accordance with address instructions on address bus 118 produced by the MPU 114.

Input/output devices 134, 138, 140 and 142 comprise conventional, eight bit latches which function as interface devices for temporary data storage, and each include eight parallel data input and output lines and, as will become apparent hereinafter additional interface elements (not shown in FIGS. 1 and 2) are operably coupled between the input/output devices 134-142 and the glidepath display means 37 as well as the control means 56. For example, the eight output data lines associated with the device 142, and represented in FIGS. 1 and 2 merely as bus 50, are operably coupled with a later discussed BCD to decimal decoder/driver and a BCD to seven segment decoder/driver, in order to operate the four digit display device 48 in accordance with data delivered on data bus 116. Similarly, the input/output device 138 is operably coupled via line 58 to the four digit display 104 through a pair of parallel intercoupled interface devices of the type described with respect to the input/output device 142. Input/output device 140 is operably coupled via line 52 to each of the plurality of indicating elements 44 using a matrixing technique, there being provided a pair of later discussed BCD to decimal decoder/drivers (not shown) intercoupled therebetween for driving the indicating elements 44. The input/output devices 134, 138, 140 and 142 are eight bit, programmable latch devices, such as that manufactured by Motorola Semiconductor Products, Inc. and identified by the manufacturer's Part No. 8212.

Figure 5:
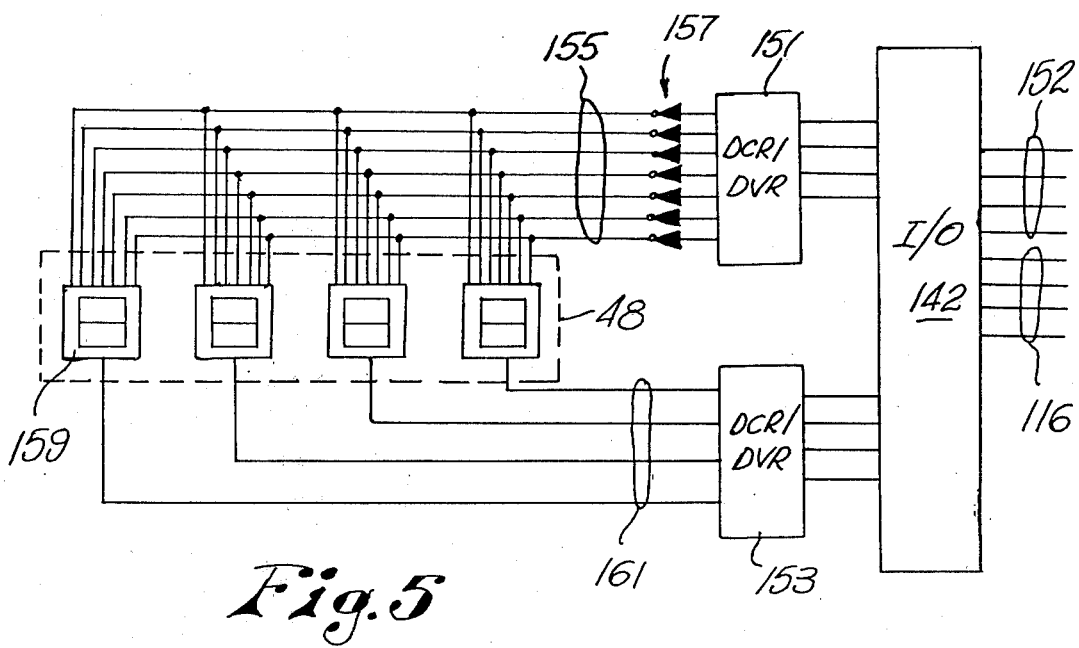
FIG. 5 is a detailed schematic diagram showing one circuit for connecting one of the numeric displays with the microcomputer.

As an example of one circuit design suitable for interfacing the address decoder 132 and MPU 114 with the various input and display hardware components of the system, reference is now made to FIG. 5 wherein a detailed schematic diagram is shown for interfacing the input/output device 142 with the display device 48. Four of the output lines 50 of the latch device 142 are coupled to the input terminals of a BCD to seven segment decoder/driver 151 while the other four output lines of the latch device 142 are coupled to the input terminals of a similar decoder/driver 153. Decoder/drivers 151 and 153 are conventionally devices such as those manufactured by the Signetics Corporation and respectively identified by the manufacturer's Part Nos. 7447 and 7442. The seven output lines 155 of decoder/driver 151 are coupled through inverters 157 to each of the seven segment displays 159 which form display device 48. Each of the displays 159 are also coupled with the decoder/driver 153 by lines 161. Decoder/driver 151 selectively energizes combinations of the output lines 155 to form specific numbers on the display device 48, in accordance the BCD code output from the latch device 142. Decoder/driver 153 selectively connects the displays 159 to ground, in accordance with the BCD code mentioned above, thereby determining which of the four digit displays 48 is illuminated. A circuit essentially identical to that described above with reference to FIG. 5 is suitable for use in interfacing the display 104 with input/output device 138.

Returning now to FIGS. 1 and 2, one data output line indicated by the numeral 154 from the input/output device 134 is operably coupled with an electronic amplifier 156, which amplifier is in turn operably coupled with a loudspeaker 158 for operating the latter. Line 62 associated with the device 134 is operably associated with the prompt lights 84-92.

Figure 6:
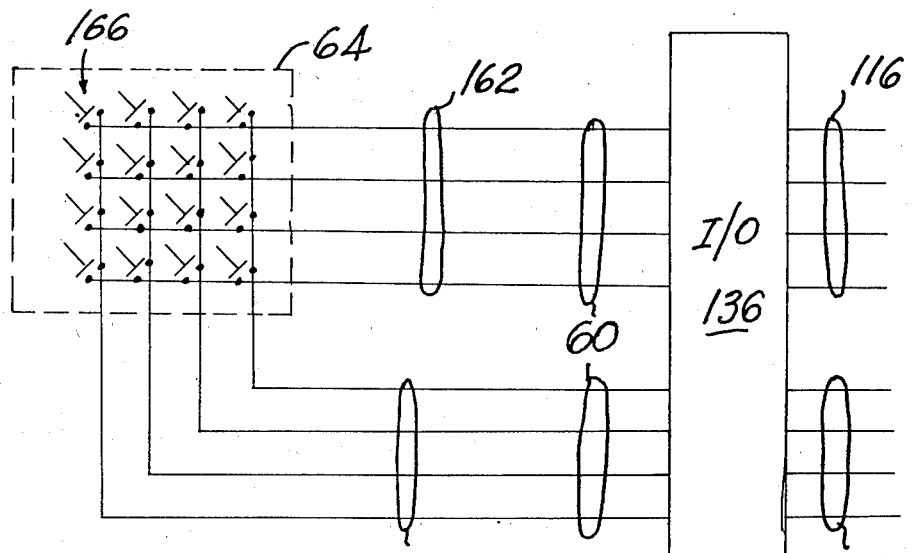
FIG. 6 is a detailed schematic diagram of a circuit showing the connection of the keyboard with the microcomputer.

Input/output device 136 comprises a peripheral interface adapter device, such as that manufactured by Motorola Semiconductor Products, Inc. and identified by the manufacturer's Part No. 6820. As shown particularly in FIG. 6, device 136 includes eight input lines 60 defined by two groups of four each thereof, 162 and 164 respectively. The lines 162 and 164 are connected in pairs to the terminals of each switch, as at 166, of a conventional 16 matrix switch set. Each of the switches 166 is of a single pole, single throw type forming a part of each of the keys of keyboard 64 and are actuated by depression of the corresponding keys. In connection with the preferred embodiment, only 12 of such switches 166 are actually employed. Depression of one of the keys connects one of the lines 162 with one of the lines 164. The device 136 is pre-programmed to produce a coded data and address output on data and address bus lines 116 and 146 in accordance with the particular combination of inputs on lines 60, to designate the particular key which is depressed.

Figure 7:
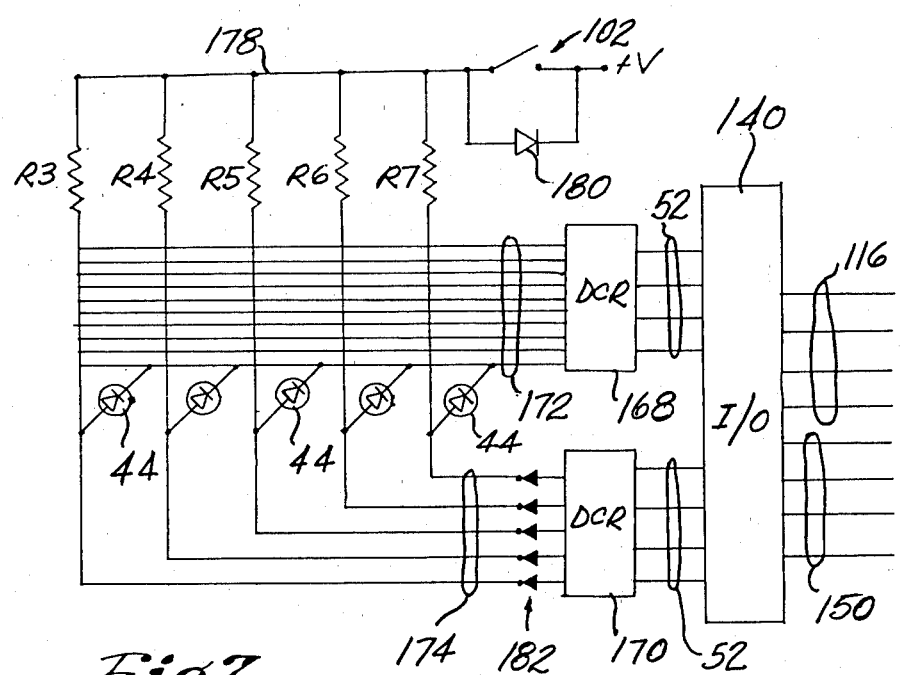
FIG. 7 is a detailed schematic circuit diagram showing the connection of the display elements with the microcomputer; and, FIGS. 8 and 9 are flow charts for a computer program suitable for operating the microcomputer.

As indicated previously, input/output device 140 is operably coupled to each of the indicating elements 44 using a matrix technique, such as that shown in FIG. 7. Input/output device 140 has two sets of four output bus lines 52 operably coupled with the inputs of BCD to decimal decoders 168 and 170 each of which are conventional devices which decode a four bit BCD number received on the input lines 52 to one of its output lines 172 or 174. The decoders 168 and 170 may be similar to that available from the Signetics Corporation and identified by the manufacturer's Part No. 7442. Output lines 172 and 174 provide a matrix such that the 50 LED's (light emitting diodes) 44 are connected between the various combinations of lines 172 and 174 in a matrix fashion (only five LED's are shown connected between lines 172 and 174 in FIG. 7 for purposes of simplicity). Signals applied to the inputs of decoders 168 and 170 representing two BCD numbers results in a particular pair of the output lines 172 and 174 going high, thereby energizing one of the fifty indicating elements 44. Amplifiers 182 are provided to increase signal strength. The microcomputer 54 delivers three groups of the BCD numbers to decoders 168 and 170 in rapid succession to produce the illuminated group of three elements 44 previously mentioned. Each element 44 remains illuminated until a different BCD number is delivered from microcomputer 54. The center element 44 of the group of three thereof is illuminated at a brighter level than the remaining two elements 44 in the group, simply due to the fact that the BCD number associated with brightest element 44 remains present for an extended period of time. Each of the output lines 174 is connected through associated resistors R3-R7 to a supply line 178 which is in turn connected to a voltage source V through a diode 180. A switch 176 is provided to short circuit diode 180 in order to increase the level of voltage delivered to LED's 44, thereby increasing the brightness thereof when required, as during day time flying.

Although those skilled in the art will be able to select and interconnect the various components of the microcomputer discussed above, reference may be made to numerous data sheets and application manuals published by various microcomputer manufacturer's, such as the "Systems reference and data sheets manual for the M6800 microcomputer", published by Motorola Semiconductor Products, Inc., the entire disclosure of which is hereby incorporated by reference therein.

Turning now to a description of the operation of the system, let it first be assumed that the pilot of the aircraft 10 desires to make a landing approach to the landing area 12 along a desired glidepath 14, and that the aircraft has not yet reached a position above the approach fix 18. The pilot first operates the switch 102 to its "ON" position thereby energizing the the system whereupon a reset signal is delivered by the one shot 124 on line 126 to the reset input of MPU 114 thereby initializing the latter and causing the MPU 114 to write zeros into all memory locations associated therewith. At this point, programmed instructions stored in the ROM 120 for controlling various displays associated with the glidepath display means 37 and control means 56 are operative to control the MPU 114 to address the device 134 and to deliver, via data bus 116 data signals through the device 134 on line 62 to the prompt light 84 thereby energizing the latter which may be interpreted by the pilot as a request that he enter the number of steps, or glidepaths 14 which will be subsequently calculated and displayed in connection with the landing approach to the landing area 12. Assuming for the moment that a single step or glidepath 14 is involved in the approach to the landing area 12, the pilot then depresses the key associated with the keyboard 64 corresponding to the numeral 1, whereupon the numeral 1 is displayed on the four digit display 104. In the event that the pilot enters the incorrect number of steps, the clear key 66 may be depressed thereby clearing the display 104 and allowing the pilot to re-enter the proper step number. Assuming now that the number 1 appears on the display 104, the pilot then depresses the enter key 68 causing data corresponding to the step 1 to be transferred, under control of the MPU 114, from the device 136 via data bus 116 to a storage location in the RAM 122 at which time the MPU 114, under instructions from the program in ROM 120, delivers data signals through device 134 on line 62 to the step light 94 and prompt light 86 thereby energizing each of the latter which the pilot may interpret as a direction to enter data into the microcomputer 54 corresponding to the altitude 16 in connection with step 1 of the landing approach. The pilot then enters the altitude 16 by means of the keyboard 64, which altitude 16 is displayed on the display 104 and is entered by means of the enter key 68. Upon entering of the altitude 16, data corresponding to such altitude 16 is delivered through the device 136 on data bus 116 to a storage location within the RAM 122, whereupon the MPU 114, under control of the ROM 120, delivers a data signal through the device 134 on line 62 to the prompt lights 86 and 88 thereby de-energizing the former and energizing the latter to indicate that the pilot should next enter data via the keyboard 64 corresponding to the distance 26. In a similar manner, the pilot subsequently enters the MDA 24 and ground speed of the aircraft 10 in response to the sequential energization of the prompt lights 84-92 while step light 94 remains energized, and such data is stored in discrete locations within the RAM 122. In the event that the pilot has entered two or more steps when the prompt light 84 was energized, upon completion of the entering of data associated with the prompt lights 86 through 92, the step light 94 will be de-energized and the step light 96 will be energized simultaneously with the activation of the prompt light 86 thereby indicating that the pilot should begin entering data associated with the second approach step beginning with the altitude 16 associated with such second step.

In any event, regardless of the number of approach steps being employed, after entering all of the data related to the first step, the MPU 114 operates on the data stored in RAM 122 in accordance with the program stored in ROM 120 for calculating the glidepath 14 as well as the time required for the aircraft 10 to pass from its position over the approach fix indicator 18 to the MDA 24 at the reference point 20. Upon performing such calculations, the ROM 120 controls the MPU 114 to deliver a first set of data signal through device 142 on bus 50 to the four digit display device 48 to display the calculated time-to-MDA, and to deliver a further set of data signals through the device 140 on bus 52 to the indicating elements 44 thereby energizing only a single one of the latter which is radially aligned with a scale marking 46 corresponding to the altitude 16, and finally, to deliver another set of data signals through device 138 on bus 58 to the display 104 in order to display the altitude 16. The circuitry of the system remains in the condition last described with the altitude 16 being indicated by the illumination of a single one of the indicating elements 44 while the calculated time-to-MDA is displayed on the four digit display device 48, until the aircraft 10 reaches a point vertically above the approach fix indicator 18 at the altitude 16 whereat the pilot depresses the push button switch 108 thereby delivering an interrupt signal via line 110 to the interrupt request input of the MPU 114, in response to which the MPU 114, under control of programmed instructions stored within ROM 120, is operative to deliver a series of timing signals via data bus 116 through the device 140 on bus 52 to the indicating elements 44, and is further operative to deliver data signals through device 138 on bus 58 to the display 104 thereby displaying a rate of descent in feet per minute corresponding to the calculated glidepath 14. The timing signals on bus 52 are initially operative to illuminate only the indicating elements 44 on adjacent sides of the single indicating element already illuminated corresponding to the altitude 16, thus initially, three of the indicating elements 44 are illuminated which are aligned with the scale markings 46 corresponding to the altitude 16. Further timing signals delivered on line 52 are operative to selectively energize the indicating elements 44 in a sequential manner to cause a group of three of such illuminated indicating elements 44 to appear to travel in a counterclockwise direction at a rate corresponding to the theoretical descent rate of the aircraft 10 from the altitude 16 to the MDA 24, consequently, it may be appreciated that the group of three illuminated indicating elements 44 provide a moving indication of a descent rate corresponding to glidepath 14 and are directly correlatable to reference altitudes between the altitude 16 and the MDA 24 lying along the glidepath 14. The pilot of the aircraft 10, upon reaching the approach fix 18 may cause the aircraft to descend at a rate which maintains the pointer 32 (which is unwinding in a counterclockwise direction) aligned with the group of three illuminated indicating elements 44 as the latter likewise move counterclockwise to maintain the aircraft 10 on the glidepath 14. When the group of three illuminated indicating elements 44 are diametrically opposite the MDA 24, the single indicating element 44 corresponding to the MDA 24 is activated, thereby indicating that the aircraft 10 is a prescribed height above the MDA 24, such prescribed height being 500 feet in the preferred form of the invention. When the group of three illuminated indicating elements 44 rotate to the circumferential position radially aligned with scale markings 46 corresponding to the MDA 24, the illuminated indicating elements 44 on opposite sides of the center illuminated element 44 in the group of three thereof, are de-energized and the remaining illuminated indicating element 44 aligned with the scale marking 46 corresponding to the MDA 24 is intermittently energized to produce a flashing effect in order to draw the pilot's attention to the fact that he has reached the MDA and that his visual attention should return to the landing area at 12 in order to complete the landing of the aircraft 10 thereat, while an audible signal is simultaneously produced by the loudspeaker 158.

In illustration of the foregoing, let it be assumed that an altitude 16 of 900 feet, and a MDA 24 of 200 feet have been entered into the microcomputer 54. Prior to the aircraft 10 reaching the approach fix 18, the indicating element 44 aligned with the scale marking 46 corresponding to the numeral 9 remains illuminated until the aircraft 10 reaches the approach fix 18 and the pilot actuates the switch 108. Upon actuation of the switch 108, one additional of the indicating elements 44 on adjacent sides of the already illuminated one thereof are likewise illuminated, and the group of three illuminated indicating elements 44 visually appear to shift counterclockwise from the 900 foot reading on the altimeter 28. When the group of three illuminated indicating elements 44 reach the 700 foot scale reading on the altimeter 28, a single one of the indicating elements 44 aligned with the scale markings corresponding to the numeral 2 on the dial face 34 is illuminated. At such time as the group of indicating elements 44 become aligned with the scale marking 46 associated with the numeral 2, two of the three illuminated indicating elements 44 are de-energized and the remaining indicating element 44 aligned with the scale marking corresponding to the numeral 2 is alternately energized to produce the flashing effect. Also, as the group of three illuminated indicating elements 44 reaches the 200 foot scale reading on the altimeter 28, the MPU 114, under control of the ROM 120, delivers a set of control signals via the data bus 116 through the device 134 on line 154 to the amplifier 156, thereby energizing the latter to drive the speaker 158 to provide an audible signal to the pilot indicating that the aircraft 10 has reached the MDA 24.

The approach fix 18 may comprise any of several types of indicators such as a compass locator or marker beacon and some landing areas may be provided with a plurality of such approach fixes 18 spaced at successively greater distances from the landing area 12 in order to allow aircraft 10 to make a stair step type landing approach which involves guiding the aircraft 10 on to two or possibly three glidepaths 14 having different descent rates associated therewith. The invention is well adapted to provide a glidepath indication associated with each of such glidepaths in stair step type landing approaches since, as previously indicated, data may be stored in the microcomputer 54 corresponding to the altitude 16, distance 26, and MDA 24 associated with each step in multi-step landing approaches. After having entered the necessary data via the control means 56 into the microcomputer 54, the pilot of the aircraft 10 need only depress the push button switch 108 each time the aircraft 10 reaches a position immediately above one of the approach fixes 18 associated with each of the corresponding glidepaths to be followed whereupon the glidepath display means 37 operates in a manner precisely as described previously.

From the foregoing, it is not only apparent that the present invention provides for novel apparatus for indicating a theoretical glidepath, but also discloses a novel method of providing an indication of the slidepath which includes the steps of: producing a series of electrically timing signals each corresponding to a reference altitude in the glidepath; visually associating a plurality of display elements with the rotatable pointer of the altimeter; and sequentially operating the display elements in accordance with the timing signals to provide a moving indication of the glidepath correlatable with the movement of the pointer to maintain the aircraft on the glidepath. The step of producing the series of electrical timing signals is carried out by: storing data corresponding to the altitude between the aircraft's position and the ground point, to the distance, and to the speed of the aircraft, then operating on the stored data in accordance with programmed instructions for calculating the glidepath, and finally generating the timing signals by associating an electrical time base reference with selective points along the calculated glidepath.

Although those skilled in the art will readily be able to devise various programs, and programmed sets of instructions, for use with the microcomputer 54 in order to achieve the desired operations described above, a brief description of the major routines and subroutines of one suitable program will now be described with reference to FIGS. 8 and 9 for sake of completeness.

Figure 8:
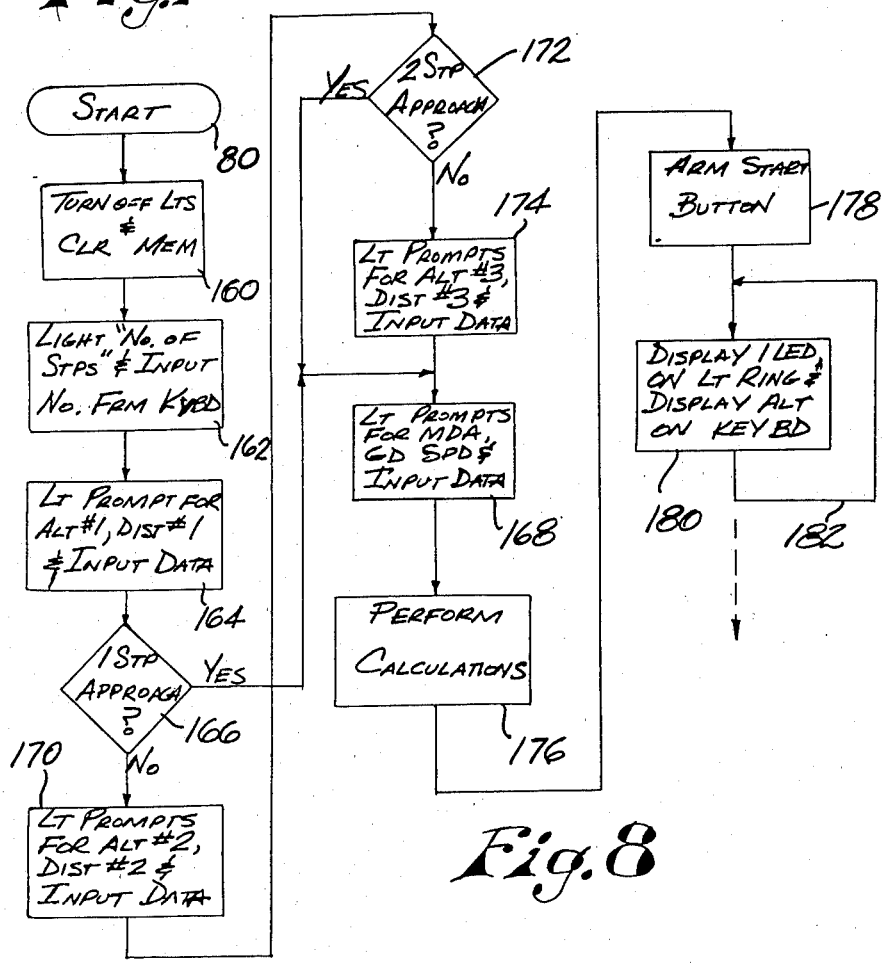
Figure 9:
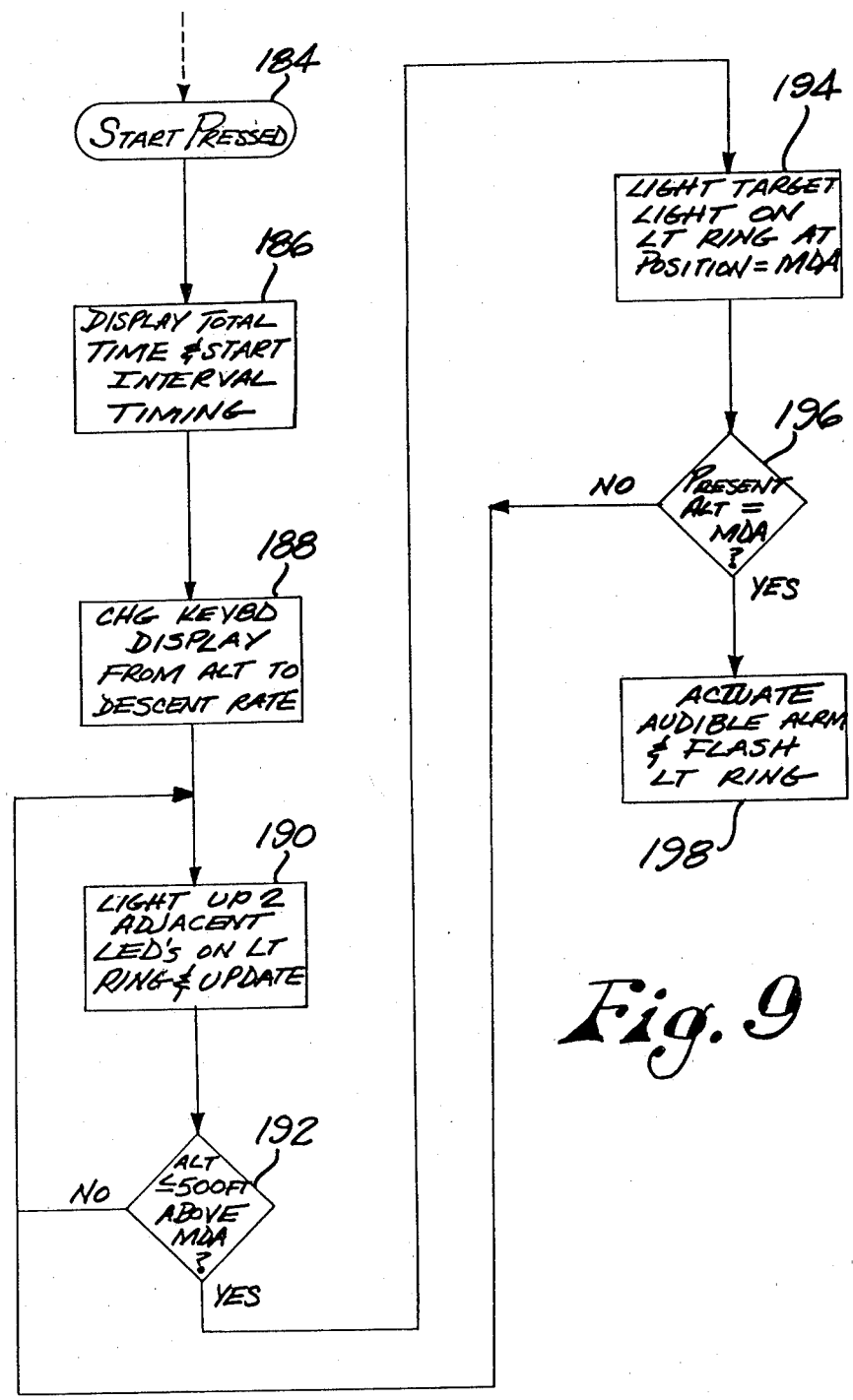

FIG. 8 depicts a flow chart for formulating programmed instructions to carry out the necessary operations in preparation for displaying the theoretical glidepath. These operations, as discussed previously, are performed well in advance of the aircraft 10 reaching the fix 18. As the pilot depresses the start key 80 a reset signal is generated by the one shot 124 which functions to turn off all displays at the display means 37 and control means 56, and initiates operation of the program at 160. The program is then devised to illuminate the number light 84, as shown in block 162, and instructs the RAM 122 to receive data from the keyboard corresponding to the number of steps which the pilot selects. Additional instructions then cause the number of steps thus selected to be displaced on one of the step lights 94–98.

Additional instructions at 164 direct the microcomputer 54 to illuminate the altitude prompt light 86 and distance prompt light 88, in preparation for the receipt of data corresponding to the altitude 16 and distance 26. A decision is then made as at 166 as to whether the approach is one or more steps. If the approach is of a single step, the instructions at 168 are next carried out. If, however, a two step approach has been chosen, instructions at 170 are provided to cause the microcomputer 54 to receive altitude and distance data for the second step of the approach. A decision is then made, as at 172, by the program as to whether or not the approach is of a two step type. If the approach is a two step, the instructions of 168 are then carried out. If however, a three step approach has been chosen, instructions at 174 permit the RAM 122 to receive the distance and altitude data corresponding to the third step. Next, the instructions as at 168 cause the MDA prompt light 90 and ground speed prompt light 92 to be illuminated and the RAM is instructed to then receive input data from the keyboard corresponding to the MDA and speed. Upon receipt of the last mentioned data into the RAM 122, instructions as at 176 cause the MPU to operate on the data in a manner to calculate the total time required for the aircraft to descend from altitude 16 to the MDA 24 and the descent rate for each step. The total time is calculated as follows:

$$\text{TOTAL TIME} = \frac{\text{(Distance \#1)} + \text{(Distance \#2)} + \text{(Distance \#3)}}{\text{Ground Speed}}$$

The descent rate for each step is calculated as follows:

DESCENT RATE #1 =

$$\frac{[(\text{Altitude \#1}) - (\text{Altitude \#2})] \times \text{Ground Speed}}{\text{Distance \#1}}$$

After the necessary calculations are completed, instructions are given as at 178 to arm the start button 108. As button 108 is armed, the instructions 180 cause a single indicating element 44 on the display 37 to be illuminated corresponding to the altitude 16, and such altitude is caused to be displayed on display 104. At this point, the program enters a loop at 182 to maintain the last mentioned displays until the start button 108 is actually depressed by the pilot.

When the start button 108 is depressed (FIG. 9), instructions at 186 cause the MPU to retrieve the calculated time for the descent from RAM 122 and deliver data corresponding to the descent time to the display 104 for display thereat. Simultaneously, instructions 186 cause the MPU 114 to subtract one second from the time calculated and stored in RAM 122 in accordance with one second pulses received by the MPU from the oscillator 128 on line 130. When the remaining time stored in RAM 122 reaches zero, the MPU blanks the display 104 and delivers a signal on data bus 116 to input/output device 134, thence to the speaker 158 in order to sound an audible alarm indicating to the pilot that the MDA 24 should have been reached. After carrying out the instructions at 186, instructions at 188 cause the MPU to cease delivering data to display 104 corresponding to altitude 16, and retrieve the descent rate from RAM 122, which descent rate data is then caused to be delivered by MPU 114 to the display 104. The MPU 114 then causes illumination of two of the indicating elements 44 on opposite sides of the indicating element illuminated in accordance with earlier instructions, pursuant to instructions at 190. Additional instructions as part of the subroutine at 190 causes the data resulting in the display of the three indicating elements 44 to be continually updated, thereby causing the group of three indicating elements to appear to move around the dial 28. The data is continually interrogated at 192 to determine whether the glidepath 14 has theoretically reached a pre-defined altitude, such as 500 feet above the MDA 24. If the glidepath 14 has not yet reached this pre-selected altitude, the instructions at 190 continue; however, when the pre-selected altitude has been reached, a set of instructions 194 cause the MPU to deliver an enabling signal to the particular indicating element 44 corresponding to the MDA 24 on the dial 28. The data being processed is further continually interrogated by instructions 196 to determine whether the MDA has been theoretically reached on the glidepath 14 in accordance with the theoretical descent rate. If the MDA has not been reached, the instructions at 190, 192 and 194 continue to be carried out, however, when the MDA is reached, a set of instructions 198 causes the MPU to send out enabling signals to both the audible alarm 158 and all of the indicating elements 44 simultaneously, in an intermittant fashion to produce flashing of all of the indicating elements 44. In the event that the approach involves more than one step, the programmed instructions comprising the subroutines 184-198 are successively repeated for each approach step.

Industrial Applicability

The construction details and method of operation of the invention have been made amply clear by the foregoing description thereof. The invention is well adapted to be used with all types of aircraft and may be employed in conjunction with other types of glidepath instrumentation to provide confirmatory data for the pilot's use.

From the foregoing, it is clear that the invention provides an especially reliable and effective system for providing an indication of a glidepath for aircraft, which is relatively simple and economical from a manufacturing standpoint. Thus, it will be observed that the system not only provides for reliable accomplishment of the object of the invention but does so in a particularly effective manner. It is recognized, of course, that those skilled in the art may make various modifications or additions to the preferred embodiment chosen to illustrate the invention without departing from the gist and essence of our contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. For use with aircraft provided with an altimeter having a dial including a rotatable pointer adapted for indicating the altitude of the aircraft, a system for calculating and indicating a theoretical glidepath between a first position at a prescribed altitude above a landing area and a second position at a pre-selected altitude above a ground point spaced a fixed distance from said landing area when the aircraft is moving at a known speed, including:

means for displaying reference altitudes corresponding to said glidepath;
structure mounting said reference altitude display means in proximity to said altimeter and in visually associable, juxtaposed relationship to said pointer;
a central processing unit operably coupled with said displaying means for controlling operation of the system;

first memory means communicatively coupled with said processing unit for storing data therein;

manually operable means communicatively coupled with said processing unit and said first memory means for inputting data including said prescribed altitude, said pre-selected altitude, said distance and the speed of said aircraft, into said first memory means for storage in the latter; and second memory means communicatively coupled with said processing unit for storing therein programmed instructions governing the operation of said processing unit, and for also storing therein a routine for computing said glidepath, said processing unit being operative to compute said glidepath in accordance with said routine therefor stored in said second memory means using said data stored in said first memory means, and being further operative to control said reference altitude display means to display said reference altitudes corresponding with said glidepath, said pointer being visually associable with said reference altitudes to allow a pilot to maintain said aircraft on said glidepath.

2. The invention of claim 1, wherein:

said first memory means comprises a random access memory device having addressable, data storage locations into which data may be written and from which data may be read, and said second memory means comprises a read only memory device having addressable data storage locations from which data may be read.

3. The invention of claim 2, further including:

first temporary data storage means operably coupled between said data inputting means and the combination of said processing unit, said first memory means and said second memory means, for temporarily accumulating and transferring data from said data inputting means to said combination;

second temporary data storage means operably coupled between said combination and said display means, for temporarily accumulating and transferring data from said combination to said display means; and manually actuatable switch means operably coupled with said processing unit for causing the latter to selectively control said displaying means for displaying said reference altitudes.

4. The invention of claim 2, wherein said data inputting means includes a plurality of manually actuatable key means each defining quantitative data and being operative upon actuation thereof for delivering said quantitative data to said first memory means for storage in the latter, and there is further provided:

means operably coupled with said processing unit and under control of the latter for visually indicating the data storage locations being addressed in said first memory means corresponding to said prescribed altitude, said pre-selected altitude, said distance and said speed.

5. The invention of claim 4, wherein there is further provided:

first means operably coupled with said processing unit for visually exhibiting data delivered from said data inputting means to said first memory means; and second means operably coupled with said processing unit for visually exhibiting a count-down of the time computed by said processing unit for traversing from said second position to said first position at said aircraft speed.

6. The invention of claim 1, wherein said displaying means includes:

a plurality of discrete, individually controllable, electrically energizable indicating elements disposed in spaced relationship to each other in a generally circular arrangement generally concentric with said altimeter dial, each of said indicating elements being operatively associable with said pointer and operative to indicate one of said reference altitudes in said glidepath, said indicating elements being controlled by said processing unit to be sequentially energized whereby to provide a moving indication of said glidepath correlatable with said pointer to maintain said aircraft on said glidepath.

7. The invention of claim 6, wherein said mounting structure includes:

a plate member having an essentially circular cutout portion therethrough adapted to be disposed in superimposed relationship with said altimeter dial, said indicating elements being mounted on said plate member in circumferentially spaced relationship around the perimeter of said cutout portion.

* * * * *